(12) United States Patent
Zamir et al.

(10) Patent No.: US 10,628,699 B2
(45) Date of Patent: Apr. 21, 2020

(54) EVENT-BASED IMAGE FEATURE EXTRACTION

(71) Applicant: SAMSUNG ELECTRONICS CO., LTD., Suwon-si, Gyeonggi-Do (KR)

(72) Inventors: Lior Zamir, Ramat Hasharon (IL); Nathan Henri Levy, Givatayim (IL)

(73) Assignee: SAMSUNG ELECTRONICS CO., LTD., Suwon-si, Gyeonggi-Do (KR)

(*) Notice: Subject to any disclaimer, the term of this patent is extended or adjusted under 35 U.S.C. 154(b) by 276 days.

(21) Appl. No.: 15/621,040

(22) Filed: Jun. 13, 2017

(65) Prior Publication Data

US 2018/0357504 A1 Dec. 13, 2018

(51) Int. Cl.
*G06K 9/46* (2006.01)
*G06K 9/00* (2006.01)

(52) U.S. Cl.
CPC ......... *G06K 9/4609* (2013.01); *G06K 9/4642* (2013.01); *G06K 2009/00738* (2013.01)

(58) Field of Classification Search
CPC ............... G06K 9/4609; G06K 9/4642; G06K 2009/00738
See application file for complete search history.

(56) References Cited

U.S. PATENT DOCUMENTS

| | | | |
|---|---|---|---|
| 8,780,240 B2 | 7/2014 | Posch et al. | |
| 8,959,040 B1 * | 2/2015 | Cruz-Albrecht | ....... G06N 3/049 706/39 |
| 9,076,065 B1 * | 7/2015 | Vijayanarasimhan | ....... G06K 9/6256 |
| 9,257,461 B2 | 2/2016 | Cho et al. | |
| 9,311,594 B1 * | 4/2016 | Fisher | ..................... G06N 3/049 |
| 9,846,677 B2 * | 12/2017 | Wang | ..................... G06F 17/141 |
| 10,311,326 B2 * | 6/2019 | Amitay | ..................... G06T 5/001 |
| 10,341,669 B2 * | 7/2019 | Lin | ..................... H04N 19/182 |
| 10,474,949 B2 * | 11/2019 | Majumdar | ............. G06N 7/005 |
| 2008/0258767 A1 * | 10/2008 | Snider | ..................... G06N 3/063 326/46 |
| 2014/0074761 A1 * | 3/2014 | Hunzinger | ............... G06N 3/02 706/15 |
| 2014/0143193 A1 * | 5/2014 | Zheng | ..................... G06N 3/049 706/25 |
| 2017/0003121 A1 | 1/2017 | Brandli et al. | |
| 2017/0024661 A1 * | 1/2017 | Hunsberger | ........... G06N 3/049 |
| 2017/0185890 A1 * | 6/2017 | Yasuda | .................. G06N 3/063 |
| 2018/0357504 A1 * | 12/2018 | Zamir | .................. G06K 9/4609 |

* cited by examiner

*Primary Examiner* — Gregory M Desire
(74) *Attorney, Agent, or Firm* — F. Chau & Associates, LLC

(57) ABSTRACT

Event-based image feature extraction includes reducing an accumulated magnitude of a leaky integrate and fire (LIF) neuron based on a difference between a current time and a previous time; receiving an event input from a dynamic vision sensor (DVS) pixel at the current time; weighting the received input; adding the weighted input to the reduced magnitude to form an accumulated magnitude of the LIF neuron at the current time; and, if the accumulated magnitude reaches a threshold, firing the neuron and decreasing the accumulated magnitude.

20 Claims, 13 Drawing Sheets

FIG. 8

EVENT-BASED IMAGE FEATURE EXTRACTION

TECHNICAL FIELD

Embodiments of the present disclosure relate to image feature extraction, and more particularly to extracting low-latency image features from event-based dynamic vision sensors.

DISCUSSION OF RELATED ART

Traditionally, image features have been obtained from frame-based cameras where the frame rate implicates a lower bound for latency. Event-based cameras may use dynamic vision sensors (DVS), which output a stream of asynchronous event data that represents the temporal changes in light intensity incident upon each pixel. In such a DVS, the internal integrative pixel state might not be provided or available as a low-latency output. When the intensity of light upon a pixel changes by a threshold amount, a substantially instantaneous event may be triggered that references or includes the pixel location, the time of change at that pixel, and the sign of that change.

SUMMARY

An exemplary embodiment method for event-based image feature extraction includes reducing an accumulated magnitude of a leaky integrate and fire (LIF) neuron based on a difference between a current time and a previous time; receiving at least one event input from at least one dynamic vision sensor (DVS) pixel at the current time; weighting the at least one received input; adding the at least one weighted input to the reduced magnitude to form an accumulated magnitude of the LIF neuron at the current time; and, if the accumulated magnitude reaches a threshold, firing the neuron and decreasing the accumulated magnitude. The exemplary embodiment method may be applied where each at least one received input is either +1 or −1 prior to weighting.

The exemplary embodiment extraction method may be applied where the LIF neuron receives event inputs from a plurality of DVS pixels in a receptive field. This method may be used where the event inputs from the receptive field are individually weighted to implement a Hough transform. This method may be used where the receptive field includes an array of DVS pixels. This method may be used where the event inputs from the receptive field are individually weighted to implement a histogram of gradients (HOG).

The exemplary embodiment extraction method may be applied where a first plurality of LIF neurons are arranged in a first layer. The method may be used where another plurality of LIF neurons is arranged in another layer.

The exemplary embodiment extraction method may be used where each of the other plurality of LIF neurons receives event inputs from at least one of the first plurality of LIF neurons. This method may be used where each of the other plurality of LIF neurons receives event inputs from all of the first plurality of LIF neurons.

The exemplary embodiment extraction method may be used where each of the other plurality of LIF neurons triggers an event output upon reaching an accumulated threshold based on an event input from any of the first plurality of LIF neurons in its receptive field. Alternatively, this method may be used where each of the other plurality of LIF neurons receives event inputs from all of the first plurality of LIF neurons in its receptive field, but triggers an event output only upon an event input from a corresponding one of the first plurality of LIF neurons.

The exemplary embodiment extraction method may be applied where the reduction is based on an exponential decay function. The exemplary embodiment method may be applied where the decrease upon firing is equal to the accumulated magnitude if the accumulated magnitude is less than a base, or equal to the base if the accumulated magnitude is greater than or equal to the base. The exemplary embodiment method may be applied where the LIF neuron is one of a plurality of LIF neurons arranged in a plurality of levels, the method further including: implementing a directionally sensitive filter using a HOG in one of the plurality of levels; and implementing a Hough transform responsive to the directionally sensitive filter in another of the plurality of levels.

An exemplary embodiment image feature extraction apparatus includes: a dynamic vision sensor (DVS) having a plurality of pixels, each pixel having an inner state indicative of light intensity upon that pixel and an event output indicative of a threshold change in its inner state; at least one layer of leaky integrate and fire (LIF) neurons connected to the plurality of pixels, each of the LIF neurons connected to a receptive field of pixels among the plurality of pixels and receiving weighted event inputs from said pixels, the pixels comprised in each receptive field and their weights with respect to said receptive field being configured differently for each LIF neuron in the layer; and at least one output from the layer indicative of a detected image feature.

The exemplary embodiment image feature extraction apparatus may be configured so the at least one layer of LIF neurons is comprised in an events unit connected to the plurality of pixels through an events circuit, the events unit configured to receive event inputs from the plurality of pixels through the events circuit and provide at least one event-based output. The exemplary embodiment image feature extraction apparatus may be configured so the events unit is configured for event signal feature extraction using at least one of a Hough transform or a histogram of gradients (HOG).

The exemplary embodiment image feature extraction apparatus may include an interface unit having at least one output channel configured for providing detected event-based image feature information. The exemplary embodiment image feature extraction apparatus may be configured so the at least one layer comprises: at least one first layer of LIF neurons connected to the event inputs from the plurality of pixels, the receptive fields and input weightings of the at least one first layer configured to implement at least one of a Hough transform or oriented gradients; and at least one second layer of LIF neurons connected to the event inputs from the at least one first layer, the receptive fields and input weightings of the at least one second layer configured to implement at least one of a histogram of gradients (HOG) or a normalized HOG.

An exemplary embodiment program storage device is provided, tangibly embodying a program of instruction steps executable by a processor for extracting event-based image features through a dynamic vision sensor, the instruction steps including: reducing an accumulated magnitude of a leaky integrate and fire (LIF) neuron based on a difference between a current time and a previous time; receiving at least one event input from at least one dynamic vision sensor (DVS) pixel at the current time; weighting the at least one received input; adding the at least one weighted input to the reduced magnitude to form an accumulated magnitude of the LIF neuron at the current time; and if the accumulated magnitude reaches a threshold, firing the neuron and decreasing the accumulated magnitude.

An exemplary embodiment method for event-based image processing includes providing a plurality of leaky integrate and fire (LIF) neurons wherein each of the plurality of LIF neurons communicates with at least one other of the plurality of LIF neurons; reducing an accumulated magnitude of each of the plurality of LIF neurons based on a difference between a current time and a previous time; receiving by at least one of the plurality of LIF neurons at least one event input from at least one dynamic vision sensor (DVS) pixel at the current time; weighting the at least one received input; and adding the at least one weighted input to the reduced magnitude to form an accumulated magnitude of the at least one of the plurality of LIF neurons at the current time.

The exemplary embodiment processing method may further include firing the at least one of the plurality of LIF neurons and decreasing its accumulated magnitude if the accumulated magnitude of the at least one of the plurality of LIF neurons reaches a threshold. The exemplary embodiment processing method may further include, if the accumulated magnitude of the at least one of the plurality of LIF neurons reaches a threshold based on receiving signals from a plurality of event inputs, but is conditioned to fire only upon receiving a signal from a particular one of the plurality of event inputs, firing the at least one of the plurality of LIF neurons and decreasing its accumulated magnitude upon receiving the signal from the particular one of the plurality of event inputs.

The exemplary embodiment processing method may be applied where the plurality of leaky integrate and fire (LIF) neurons is provided in a multi-dimensional array having at least two conceptual dimensions (2D). The exemplary embodiment processing method may be applied where wherein the plurality of leaky integrate and fire (LIF) neurons is provided in a multi-dimensional array having three conceptual dimensions (3D), the 3D array comprising a plurality of layers of LIF neurons wherein each LIF neuron of a layer is interconnected to all of the LIF neurons of each directly adjacent layer.

The exemplary embodiment processing method may be applied where each interconnection between each pair of leaky integrate and fire (LIF) neurons is individually weighted, respectively. The exemplary embodiment processing method may be applied where a plurality of the plurality of layers implement histograms of gradients (HOGs). The exemplary embodiment processing method may be applied where a first of the plurality of layers implements an un-normalized histogram of gradients (HOG) and a second of the plurality of layers implements a normalized HOG.

The exemplary embodiment processing method may be applied where a first of the plurality of layers implements a histogram of gradients (HOG) and a second of the plurality of layers implements a Hough transform. The exemplary embodiment processing method may be applied where the first of the plurality of layers is interconnected with the DVS pixels, each LIF of the first of the plurality of layers having a receptive field responsive to a plurality of the DVS pixels. The exemplary embodiment processing method may be applied where the receptive fields are non-overlapping.

BRIEF DESCRIPTION OF THE DRAWINGS

Aspects of the present disclosure may be appreciated upon consideration of the following description of exemplary embodiments when taken in conjunction with the accompanying drawings, in which:

FIG. 8 is a schematic circuit diagram of an event-based pixel for a dynamic vision sensor in accordance with an exemplary embodiment of the present disclosure;

DETAILED DESCRIPTION

A method and apparatus for event-based image feature extraction uses data from dynamic vision sensors (DVS) or event-based cameras, for which each pixel is sensitive to changes in light intensity. The number of events output by each pixel, such as following a reset, may be proportional to the light intensity upon that pixel. If motion or incident lighting changes are present, for example, and the feature to be extracted includes an edge or localized difference, the DVS event data may be used in substantially native form without converting event data into intensity data. Embodiments of the present disclosure provide algorithms for extracting visual features from event-based cameras while maintaining compatibility with the asynchronous nature of DVS event streams.

Extraction of visual features may be used in computer vision applications such as object detection and tracking, for example. Such applications may benefit from the low latency of feature extraction algorithms utilizing the particular characteristics of event-based cameras.

The present disclosure describes exemplary embodiments for feature extraction applied to event-based camera streams. An embodiment may include extraction of at least one histogram of gradients (HOG) or a Hough transform, as adapted to utilize the nature of event streams while providing feature extraction results asynchronously and with low latency.

The histograms of oriented gradients algorithm is a feature extraction technique that may be used for object detection and tracking tasks. The algorithm works by extracting local gradient orientations, and accumulating these in local histograms.

The Hough transform is another technique for feature extraction. It may be used for detection of shapes such as lines, circles, and the like, as well as general objects in noisy images. The algorithm works by maintaining a vote map that accumulates evidence for the existence of the desired shape. The shapes are represented in a chosen parameter space. For example, a line may be represented by a distance to an origin and an angle. When an image pixel is detected at position p that may belong to the desired shape, all locations in the map corresponding to shapes going through p are incremented. A more computationally efficient version is the randomized Hough transform. In the randomized variant, not all locations are incremented, but only a random subset of those locations. In either case, strong peaks in the map generally correspond to salient objects in the scene.

Figure 1:
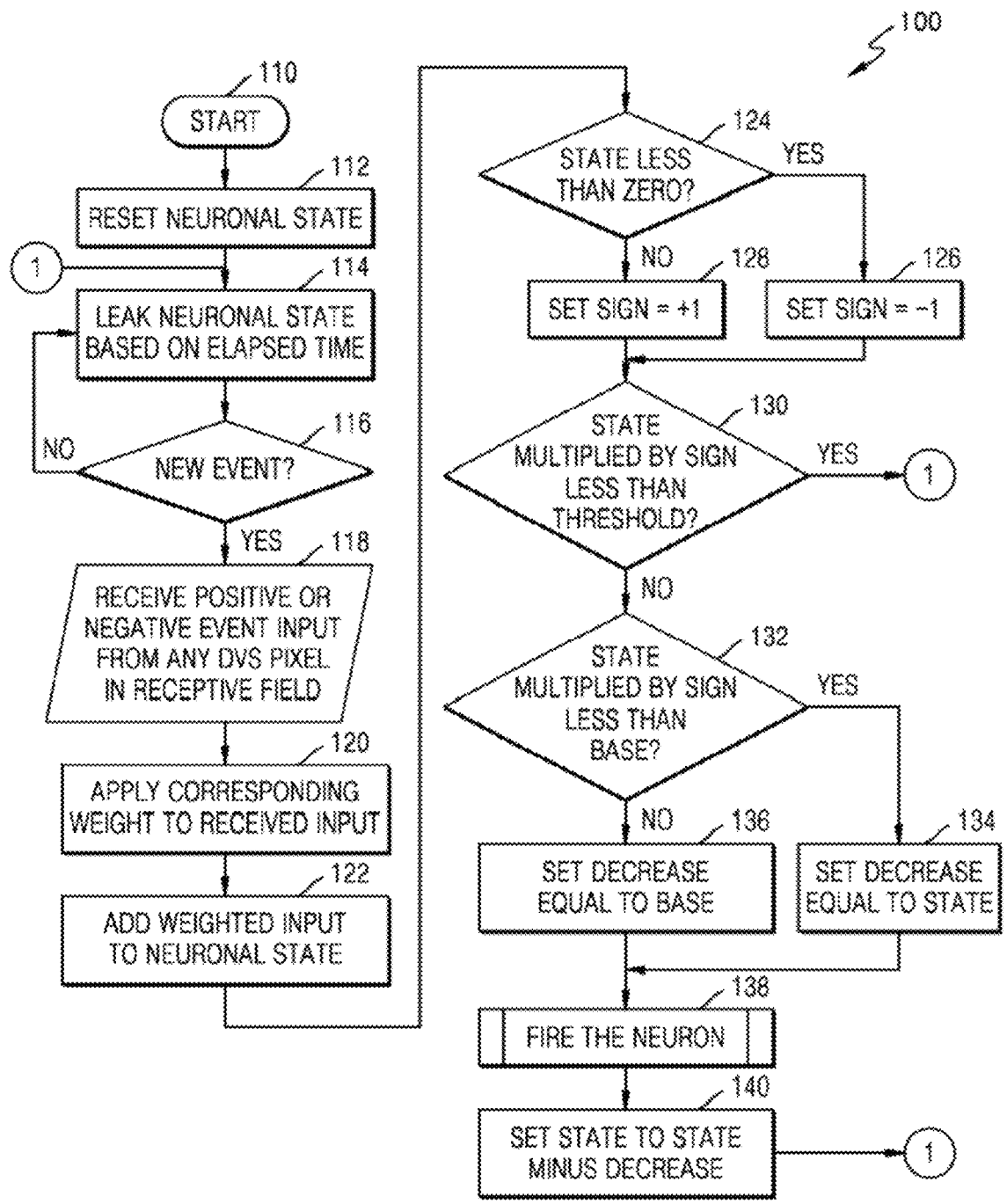
FIG. 1 is schematic flow diagram of a method for event-based image feature extraction in accordance with an exemplary embodiment of the present disclosure.

As shown in FIG. 1, an exemplary embodiment method for event-based image feature extraction using LIF neurons is indicated generally by the reference numeral 100. The method includes a start block 110 that passes control to a function block 112. The function block 112 resets an accumulation function or neuronal state, and passes control to a function block 114. The function block 114 leaks neuronal magnitude according to a decay term, and passes control to a decision block 116.

The decision block 116 determines if there has been a new event; if not, passing control back to function block 114; or if so, passing control on to an input block 118. The input block 118 receives a positive or negative event input from any dynamic vision sensor pixel in the receptive field of the LIF neuron, and passes control to a function block 120. The function block 120 applies a corresponding weight the received input, and passes control to a function block 122. The function block 122, in turn, adds the weighted input to the neuronal state, and passes control to a decision block 124.

The decision block determines whether the neuronal state is less than zero; if so, setting the sign to negative one at function block 126; or if so, setting the sign to positive one at function block 128. Function blocks 126 and 128 pass control to a decision block 130. The decision block 130 determines whether the state multiplied by the sign is less than a threshold; if so passing control back to function block 114; or if not passing control to another decision block 132.

The decision block 132, in turn, determines whether the state multiplied by the sign is less than a base; if so passing control to a function block 134 to set a decrease equal to the state; or if not passing control to a function block 136 to set the decrease equal to the base. Function blocks 134 and 136 pass control to a block 138, which fires the neuron and passes control to a function block 140. The function block 140, in turn, passes control back to the function block 114.

Although the looping method of FIG. 1 has been shown and described for ease of explanation, alternate embodiments may use interrupt-driven methods or the like to achieve high-resolution accuracy or meet design criteria. It shall be understood that the base and threshold may be pre-determined and/or fixed for a given application, but that they may also be variable such as for changes in ambient lighting, for example.

Figure 2:
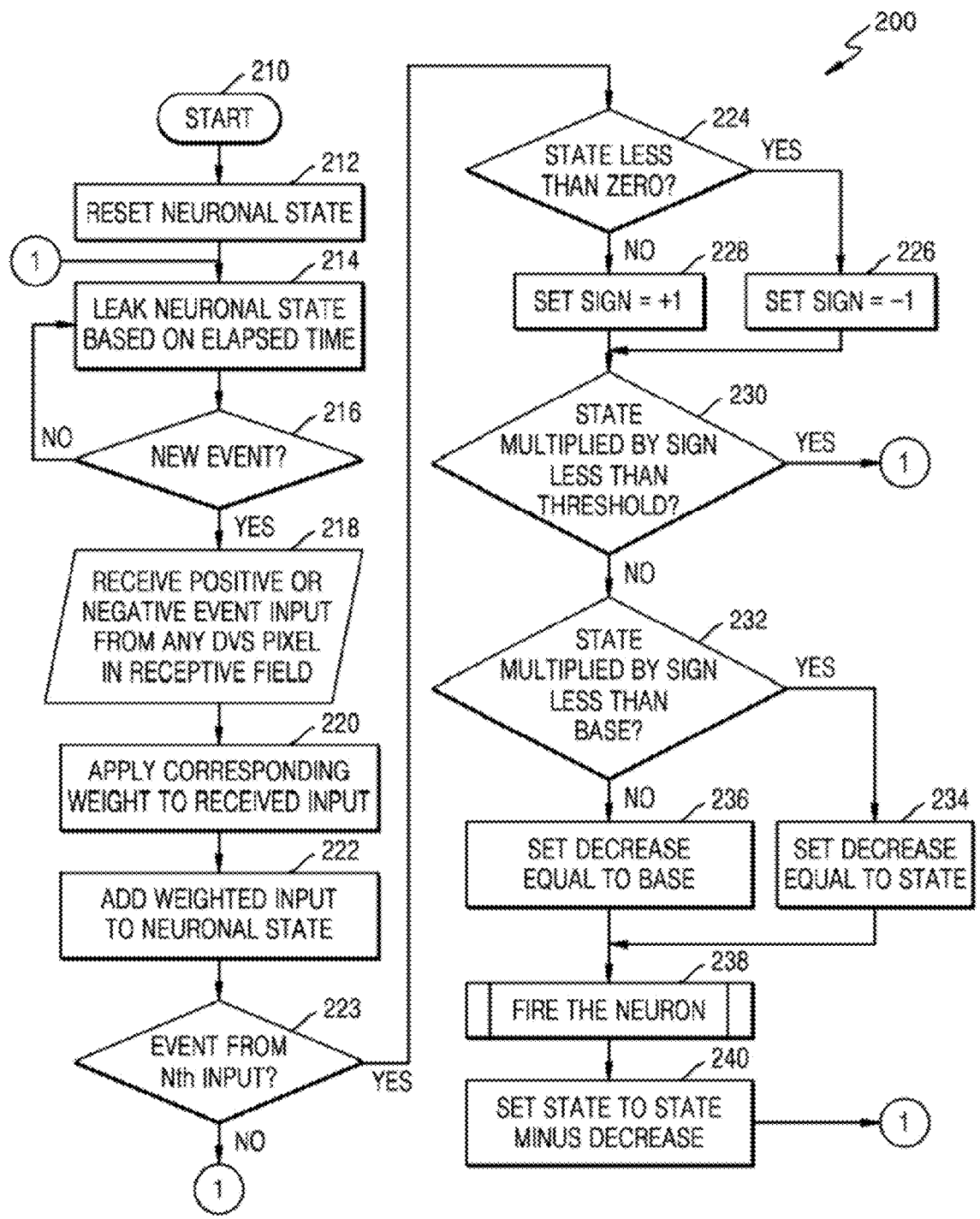
FIG. 2 is schematic flow diagram of a method for event-based image feature extraction for a histogram of gradients (HOG) normalization layer in accordance with an exemplary embodiment of the present disclosure.

Turning to FIG. 2, an exemplary embodiment method for event-based image feature extraction for a histogram of gradients (HOG) normalization layer is indicated generally by the reference numeral 200. The method includes a start block 210 that passes control to a function block 212. The function block 212 resets an accumulation function or neuronal state, and passes control to a function block 214. The function block 214 leaks neuronal magnitude according to a decay function, such as, for example, the exponential decay function of Equation 1, and passes control to a decision block 216.

The decision block 216 determines if there has been a new event; if not, passing control back to function block 214; or if so, passing control on to an input block 218. The input block 218 receives a positive or negative event input from any dynamic vision sensor pixel in the receptive field of the neuron, and passes control to a function block 220. The function block 220 applies a corresponding weight the received input, and passes control to a function block 222. The function block 222, in turn, adds the weighted input to the neuronal state, and passes control to a decision block 223.

The decision block 223 determines whether the event was specifically from a designated Nth input; if not, passing control back to the function block 214; or if so, passing control to another decision block 224. The decision block determines whether the neuronal state is less than zero; if so, setting the sign to negative one at function block 226; or if so, setting the sign to positive one at function block 228. Function blocks 226 and 228 pass control to a decision block 230. The decision block 230 determines whether the state multiplied by the sign is less than a threshold; if so passing control back to function block 214; or if not passing control to another decision block 232.

The decision block 232, in turn, determines whether the state multiplied by the sign is less than a base; if so passing control to a function block 234 to set a decrease equal to the state; or if not passing control to a function block 236 to set the decrease equal to the base. Function blocks 234 and 236 pass control to a block 238, which fires the neuron and passes control to a function block 240. The function block 240, in turn, passes control back to the function block 214.

Figure 3:
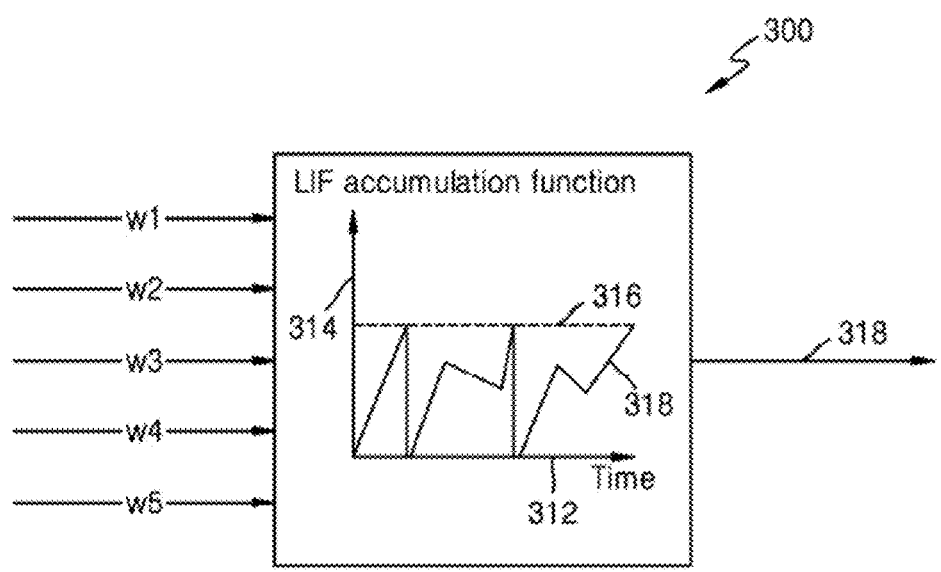
FIG. 3 is a time-wise graphical diagram of a leaky integrate and fire (LIF) neuron in accordance with an exemplary embodiment of the present disclosure.

Turning now to FIG. 3, an exemplary embodiment characteristic leaky integrate and fire (LIF) neuron is indicated generally by the reference numeral 300. The central unit of computation in the methods described herein is a LIF neuron. The characteristic function of the leaky integrate and fire neuron is shown with a horizontal axis 312 of time, and a vertical axis 314 of accumulation function or neuronal state amplitude. Here, a threshold is indicated by the reference numeral 316, and the leaky integrate and fire neuron's characteristic accumulation function, which is a function of time, is indicated by the reference numeral 318, which is also the output. A neuron has N inputs (called the receptive field) $\{I_1, \ldots, I_N\}$ from which it receives spikes (events) with values of either +1 or −1 in any point in time. Each input is also assigned a constant weight $\{w_1, \ldots, w_N\}$.

There is an accumulation function f(t) that is updated in accordance with Equations 1, 2, 3 and 4, where time is assumed to be discrete with high temporal resolution, $t_c$ and $t_p$ are the times of the current and previous events, respectively, and where the current event came from input n:

$$a(t_c) = a(t_p) \cdot e^{(t_c - t_p) \cdot d} + I_n \cdot W_n \qquad \text{(EQN. 1)}$$

$$\text{sign} = \begin{cases} -1, & a(t_c) < 0 \\ +1, & a(t_c) > 0 \end{cases} \qquad \text{(EQN. 2)}$$

$$\text{decrease} = \begin{cases} a(t_c), & \text{sign} \cdot a(t_c) < b \\ \text{sign} \cdot b, & \text{sign} \cdot a(t_c) > b \end{cases} \qquad \text{(EQN. 3)}$$

$$f(t_c) = \begin{cases} a(t_c), & \text{sign} \cdot a(t_c) < \text{thresh} \\ a(t_c) - \text{decrease}, & \text{sign} \cdot a(t_c) > \text{thresh} \end{cases} \qquad \text{(EQN. 4)}$$

Here, d controls the decay in time; b controls the base decrease after a fire event; and thresh is the firing threshold. In the case where sign·a($t_c$) is greater than or equal to thresh, a fire event is triggered according to the sign. Another possibility is to condition the neuron to fire on an event only if the event came from input n, such as may be applied in a normalization layer of a layered HOG implementation. Either LIF model may be used in layered network structures, such as in convolutional neural networks, in order to perform image feature extraction operations.

Figure 4:
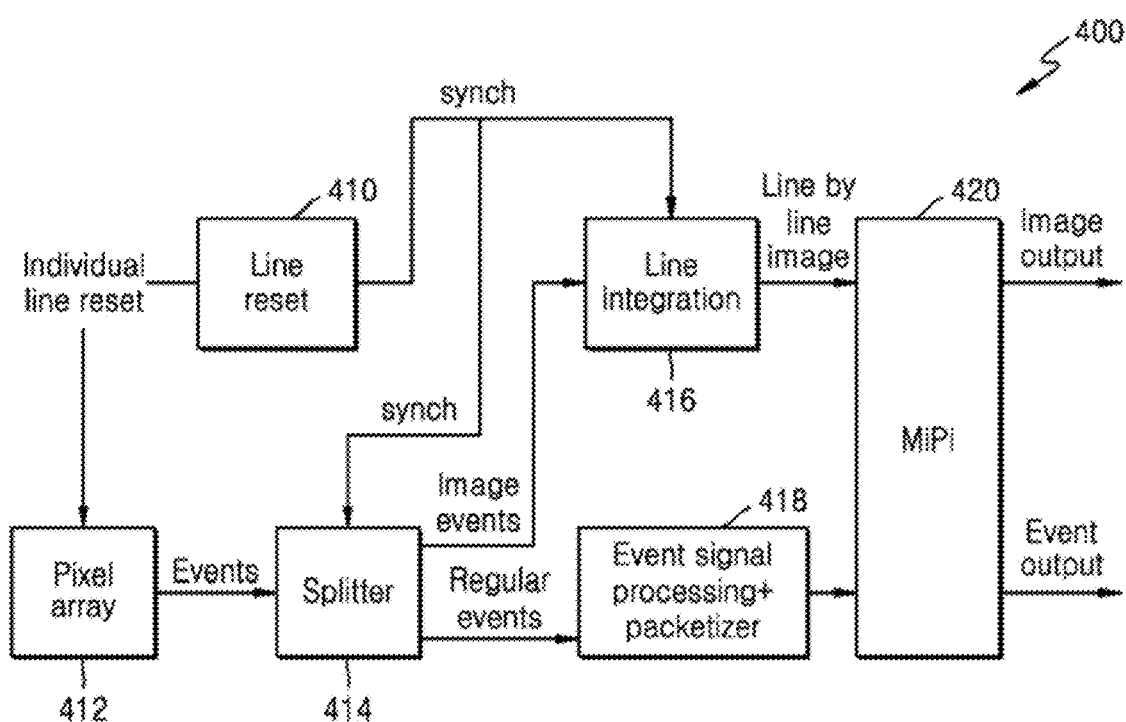
FIG. 4 is a schematic block diagram of an event-based image feature extraction system in accordance with an exemplary embodiment of the present disclosure.

As shown in FIG. 4, an exemplary embodiment event-based image feature extraction system is indicated generally by the reference numeral 400. The event-based image feature extraction system 400 includes a region or line reset timing unit 410, a dynamic vision sensor (DVS) pixel array 412 connected to the timing unit through a region or line reset circuit, an output splitter 414 connected to the plurality of pixels through an events circuit and connected to the timing unit through a synchronization circuit, an events unit 418 connected to the splitter through an events circuit, a region or line integration unit 416 connected to the splitter through the events circuit and connected to the timing unit through the synchronization circuit, and an interface unit 420 connected to the region or line integration unit and further connected to the events unit.

Figure 5:
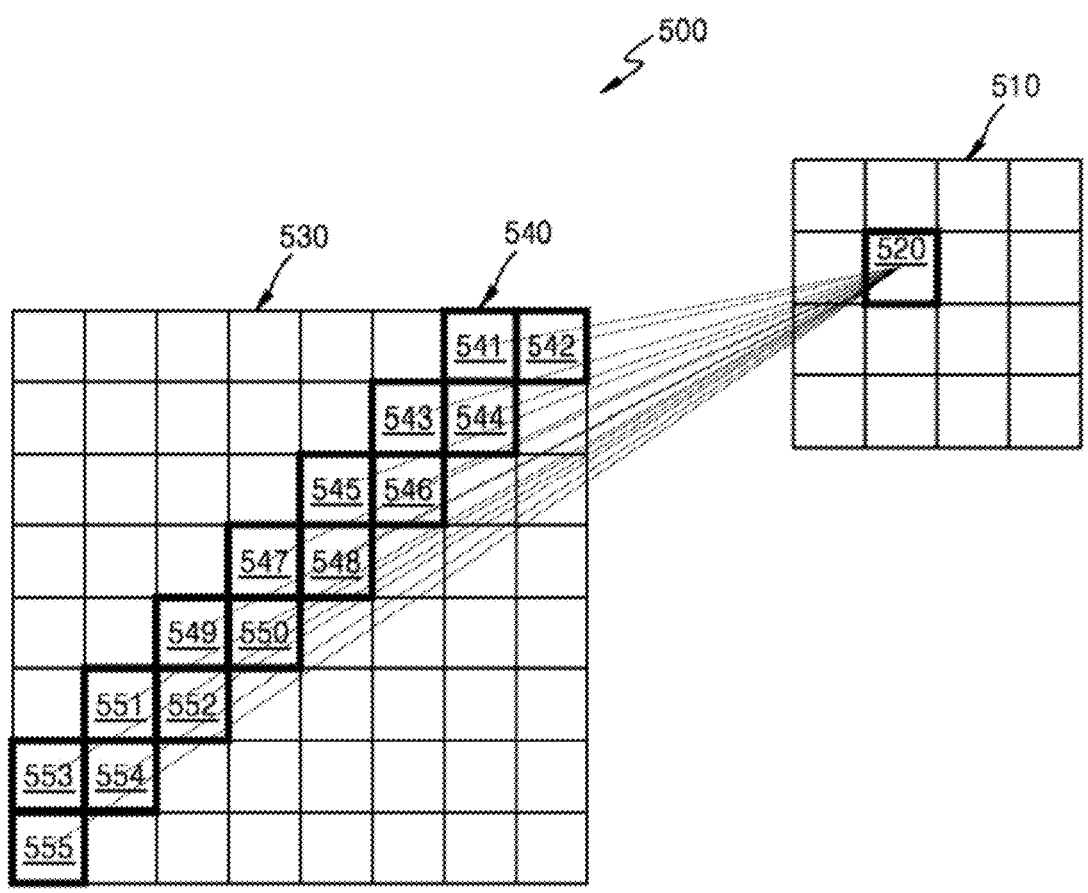
FIG. 5 is a schematic block diagram of a receptive field of pixels suited for event-based Hough transform feature extraction in accordance with an exemplary embodiment of the present disclosure.

Turning to FIG. 5, an exemplary embodiment neuronal mapping for a receptive field of pixels suited for event-based Hough transform feature extraction is indicated generally by the reference numeral 500. Here, a layer of neurons 510 includes a LIF neuron 520. A pixel array 530 includes a receptive field of pixels 540, including individual DVS pixels 541-555. In operation, events from the DVS pixels are individually weighted and input to the accumulation function of the LIF neuron 520. The exemplary mapping shown is a LIF configuration particularly suited for Hough Transform line detection, although not limited thereto.

Figure 6:
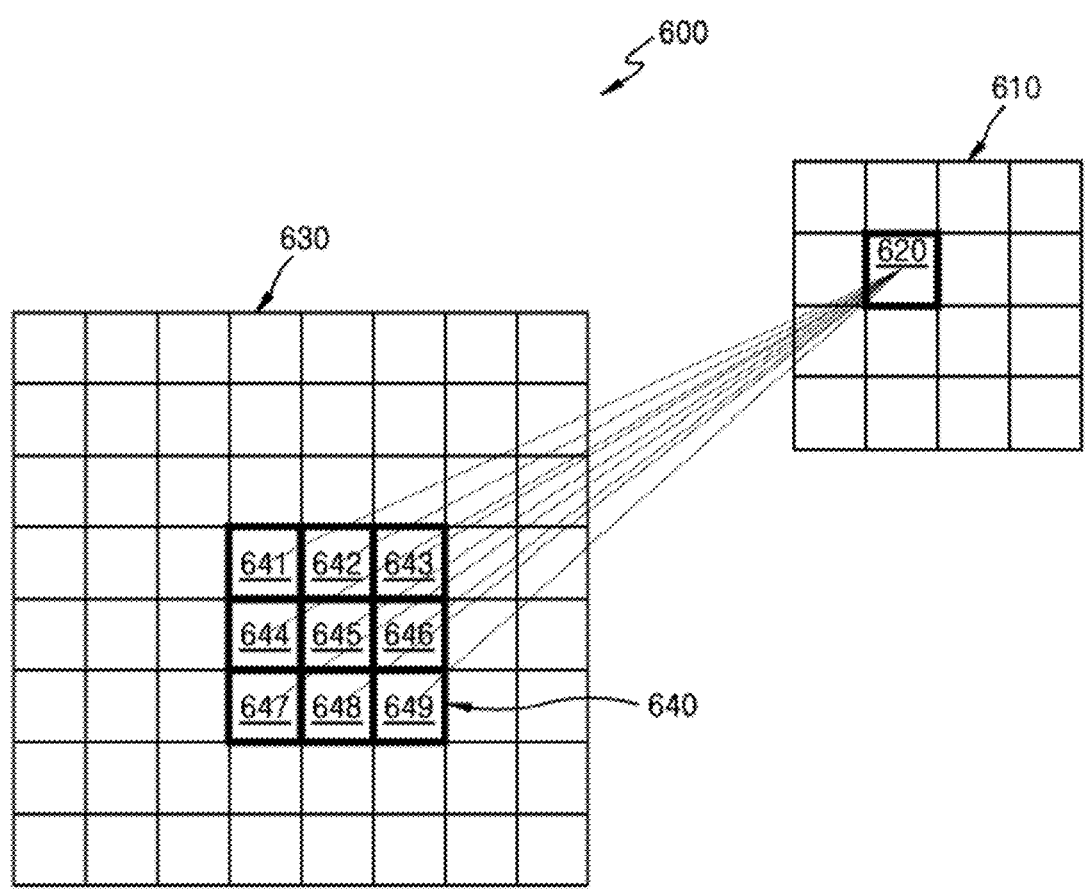
FIG. 6 is a schematic block diagram of receptive field of pixels suited for event-based HOG feature extraction in accordance with an exemplary embodiment of the present disclosure.

Turning now to FIG. 6, an exemplary embodiment neuronal mapping for a receptive field of pixels suited for event-based HOG image feature extraction is indicated generally by the reference numeral 600. Here, a layer of neurons 610 includes a LIF neuron 620. A pixel array 630 includes a receptive field of pixels 640, including individual DVS pixels 641-649. In operation, events from the DVS pixels are individually weighted and input to the accumulation function of the LIF neuron 620. The exemplary mapping shown is a LIF configuration particularly suited for event-based image feature extraction such as HOG feature extraction, although not limited thereto. Two layers are shown with a receptive field of 3×3 for each neuron in the second layer. Although a 3×3 matrix is shown for ease of description, it shall be understood that any size matrix or generalized area is usable, including non-overlapping tessellations and the like. Moreover, the receptive fields for separate neurons may overlap in alternate embodiments.

Figure 7:
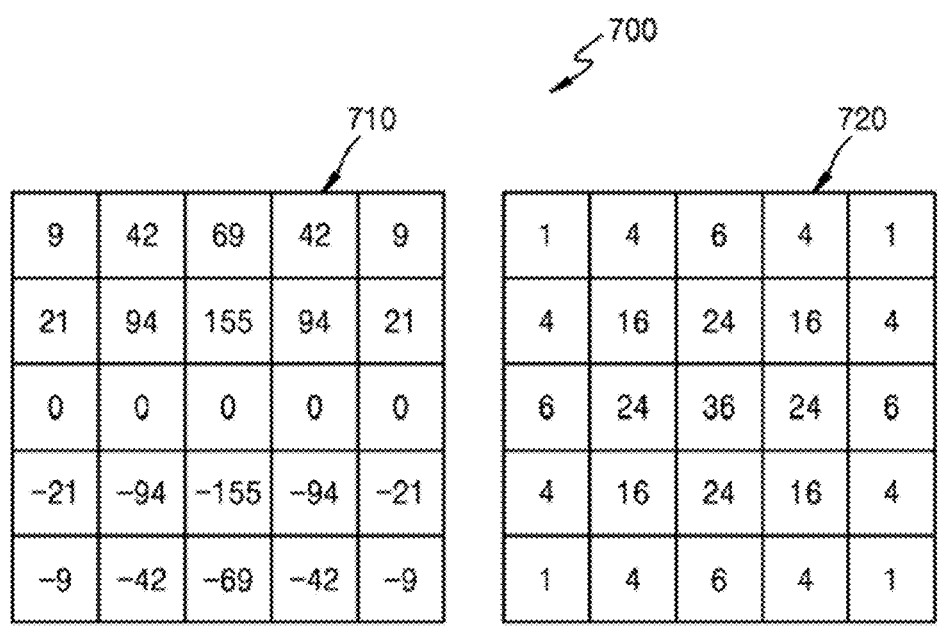
FIG. 7 is a schematic block diagram of weighted LIF neuron layers suited for HOG feature extraction in accordance with an exemplary embodiment of the present disclosure.

As shown in FIG. 7, exemplary embodiment weighted LIF neuron layers suited for HOG feature extraction are indicated generally by the reference numeral 700. Here, the weighted LIF neuron layer 710, on the left, includes weights configured for horizontal edge detection. The middle row of the layer 710 includes weights of substantially zero. The weighted LIF neuron layer 720, on the right, includes weights configured for weighted summation. These weights are substantially symmetric about the center, decreasing with distance from the center.

Figure 8:
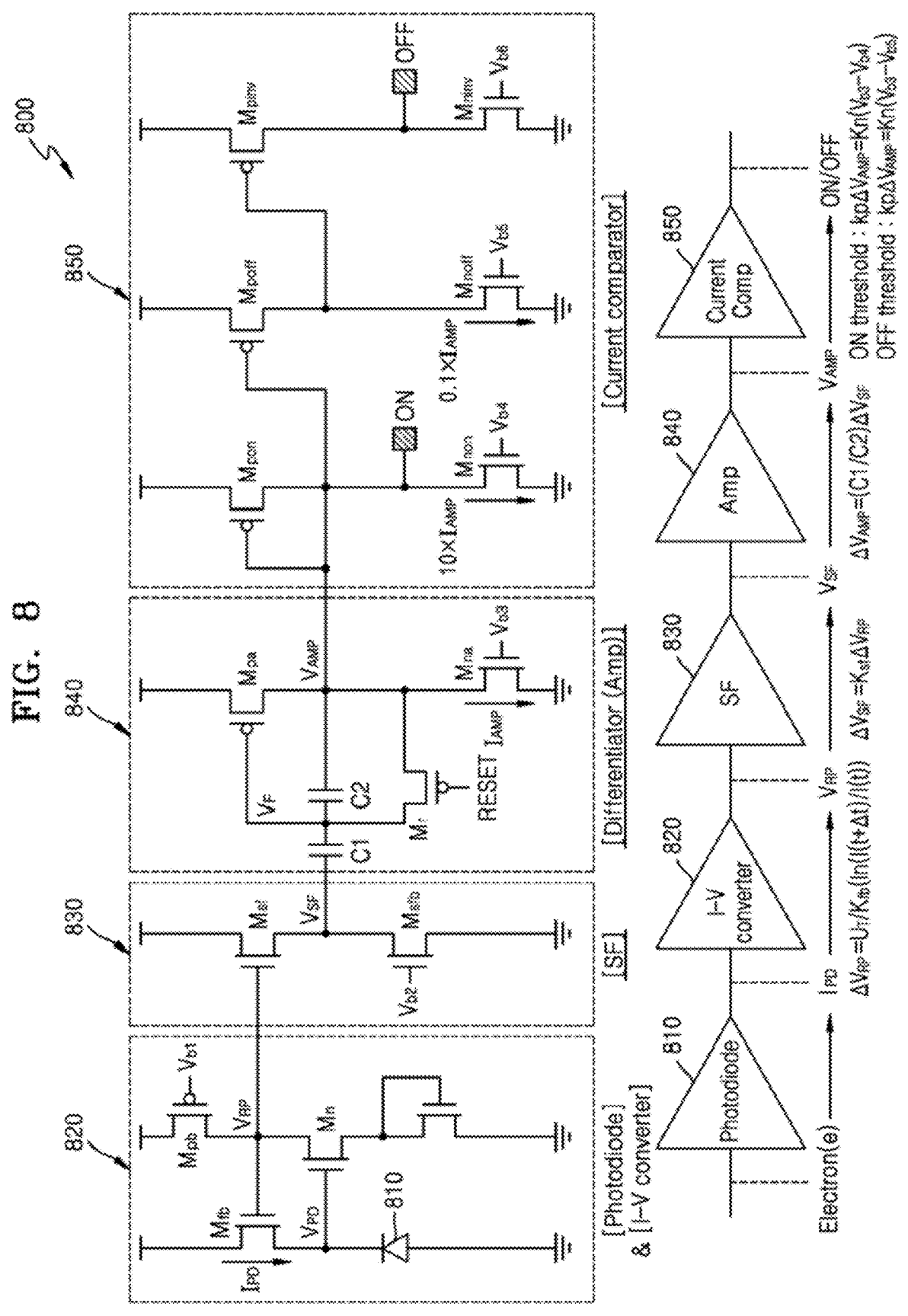

Turning to FIG. 8, an exemplary embodiment event-based pixel for a dynamic vision sensor is indicated generally by the reference numeral 800. The pixel 800 includes a photodiode 810 connected to a current to voltage (I-V) converter 820, the I-V converter including up to four transistors; a source-follower (SF) 830 connected to the I-V converter, the SF including up to two transistors; a differentiator amplifier (Amp) 840 connected to the SF, the Amp including up to three transistors; and a current comparator 850 connected to the Amp, the current comparator including up to six transistors. Thus, each pixel of the dynamic vision sensor may include one photodiode and up to 15 transistors.

In greater detail, the photodiode 810 is configured with its anode connected to ground voltage and its cathode connected to a node with voltage potential $V_{PD}$. In the converter 820, an N-channel MOSFET (NMOS) transistor $M_{fb}$ has its drain connected to power voltage, source connected to the $V_{PD}$ node, and gate connected to $V_{RP}$. Thus, an induced current $I_{PD}$ flows from power to ground through $M_{fb}$ and the photodiode 810. A P-channel MOSFET (PMOS) transistor $M_{pb}$ has its source connected to power, drain connected to $V_{RP}$, and gate connected to $V_{b1}$. An NMOS transistor $M_n$ has its gate connected to $V_{PD}$, drain connected to $V_{RP}$, and source connected to the drain and gate of another NMOS having its source connected to ground.

In the SF 830, an NMOS transistor $M_{sf}$ has its gate connected to $V_{RP}$, drain connected to power, and source connected to a node with potential $V_{SF}$. Another NMOS transistor $M_{sfb}$ has its source connected to ground, drain connected to $V_{SF}$, and gate connected to $V_{b2}$.

In the amplifier 840, a capacitor C1 is connected between $V_{SF}$ and $V_F$, and another capacitor C2 is connected between $V_F$ and $V_{AMP}$. A PMOS transistor $M_{pa}$ has gate to $V_F$, source to power, and drain to $V_{AMP}$. Another PMOS transistor $M_r$ has drain to $V_F$, source to $V_{AMP}$, and gate connected to a RESET terminal. An NMOS transistor $M_{na}$ has drain to $V_{AMP}$, source to ground, and gate to $V_{b3}$. A current $I_{AMP}$ flows across $M_{na}$ to ground.

In the comparator 850, a PMOS transistor $M_{pon}$ has gate to $V_{AMP}$, source to power, and drain to an ON terminal. An NMOS transistor $M_{non}$, in turn, has gate to $V_{b4}$, drain to the ON terminal, and source to ground. Another PMOS transistor $M_{poff}$ has gate to $V_{AMP}$, source to power, and drain to gate of PMOS $M_{pinv}$ and drain of NMOS $M_{noff}$. The NMOS transistor $M_{noff}$, in turn, has gate to $V_{b5}$, and source to ground. Here, a current of $0.1 \times I_{AMP}$ flows across $M_{noff}$ to ground. The PMOS $M_{pinv}$ has source to power and drain to an OFF terminal, while an NMOS $M_{ninv}$ has drain to the OFF terminal and source to ground.

In operation with reference to the equations set forth below, electrons produced by the photodiode 810 produce the current $I_{PD}$, which the I-V converter 820 uses to produce a change in the voltage $V_{RP}$ according to the formula of Equation 5.

$$\Delta V_{RP} = U_T/k_{fb}(\ln(I(t+\Delta t)/I(t))) \quad \text{(EQN. 5)}$$

The SF 830, in turn, uses the change in voltage $V_{RP}$ to produce a change in voltage $V_{SF}$ according to Equation 6.

$$\Delta V_{SF} = k_{sf}\Delta V_{RP} \quad \text{(EQN. 6)}$$

The Amp 840 uses the change in voltage $V_{SF}$ to produce a change in voltage $V_{AMP}$ according to Equation 7.

$$\Delta V_{AMP} = (C1/C2)\Delta V_{SF} \quad \text{(EQN. 7)}$$

At an ON threshold, the current comparator 850 produces an output according to Equation 8.

$$\text{ON threshold:} kp\Delta V_{AMP} = kn(V_{b3}*V_{b4}) \quad \text{(EQN. 8)}$$

At an OFF threshold, it produces an output according to Equation 9.

$$\text{OFF threshold:} kp\Delta V_{AMP} = kn(V_{b3}*V_{b5}) \quad \text{(EQN. 9)}$$

Table A represents an exemplary data sheet for the DVS of FIG. 8.

TABLE A

| Resolution | | | VGA (640 × 480) |
|---|---|---|---|
| Pixel Pitch | | mm | 9 |
| Chip Size | | mm2 | 9.7 × 8.0 |
| Voltage | Analog | V | 1.35~1.65 (1.5 ± 10%) |
| | Bias | V | 2.52~3.08 (2.8 ± 10%) |
| Temperature | | °C. | 25~90 |
| Illumination Dynamic range | | dB | 66 (5~10,000 Lux) |
| Minimum Contrast Sensitivity | | % | 19 |
| Stationary Noise | <100 Lux | EPS | 0.12 |
| Event per pixel | <10,000 Lux | EPS | 0.048 |
| Peak Event Data Rate | Single AER | EPS | 5.2 |
| Pixel Response | @250 Lux | msec | 40(On)/160 (Off) |
| Latency | @750 Lux | msec | 6 (On)/55 (Off) |
| Power Consumption (Low Activity) | Pixel | mW | 3 |
| | Bias Gen. | mW | 2 |
| | AER & Logic | mW | 3 |
| Power Consumption (High Activity) | Pixel | mW | 3 |
| | Bias Gen. | mW | 2 |
| | AER & Logic | mW | 10 |

With reference to FIGS. 4 and 8, the system 400 includes the DVS 412 having pixels 800, each pixel having an inner state indicative of light intensity upon that pixel and an event output indicative of a threshold change in its inner state. The timing unit 410 is connected to the plurality of pixels through the reset circuit, where the reset circuit is configured to reset the inner states of each of the plurality of pixels upon a signal from the timing unit. The output splitter 414 is connected to the plurality of pixels 800 through an events circuit, and connected to the timing unit 410 through a synchronization circuit, where the output splitter is configured to separate events output by the plurality of pixels from events output by other pixels. The events unit 418 is connected to the splitter through an events circuit, where the events unit is configured to receive events from the other pixels and provide them as event-based outputs. The integration unit 416 is connected to the splitter through the events circuit, and connected to the timing unit through the synchronization circuit, where the integration unit is configured to form pixel intensity data by integrating the events for each of the plurality of pixels, and to provide the integrated pixel data as intensity image outputs.

Figure 9:
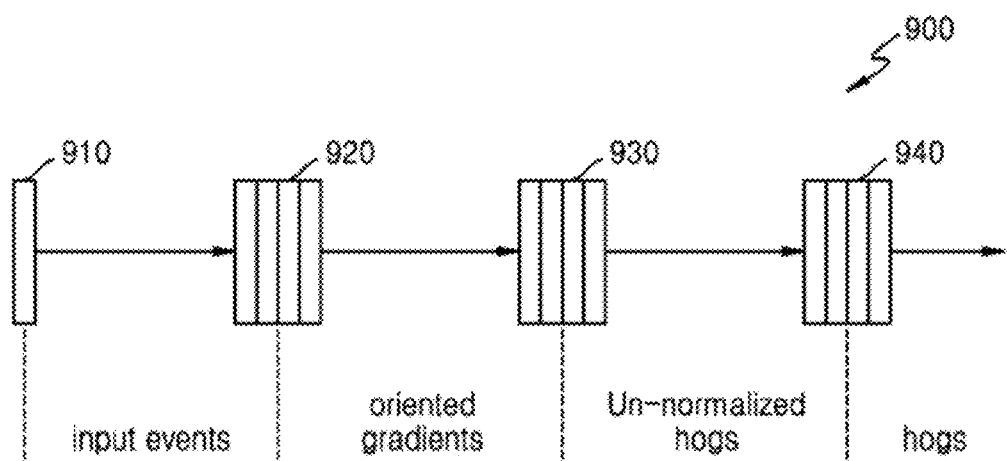
FIG. 9 is a schematic block diagram of event-based HOG feature extraction using layers of LIF neurons in accordance with an exemplary embodiment of the present disclosure.

Turning now to FIG. 9, an exemplary embodiment event-based HOG feature extraction using layers of LIF neurons is indicated generally by the reference numeral 900. The exemplary layered HOG process is an event-based HOG approach using layers of LIF neurons. Here, a first layer 910 processes input events. The layers 920 apply oriented gradients. The layers 930 apply un-normalized histograms of gradients. The layers 940, in turn, apply normalized histograms of gradients.

Figure 10:
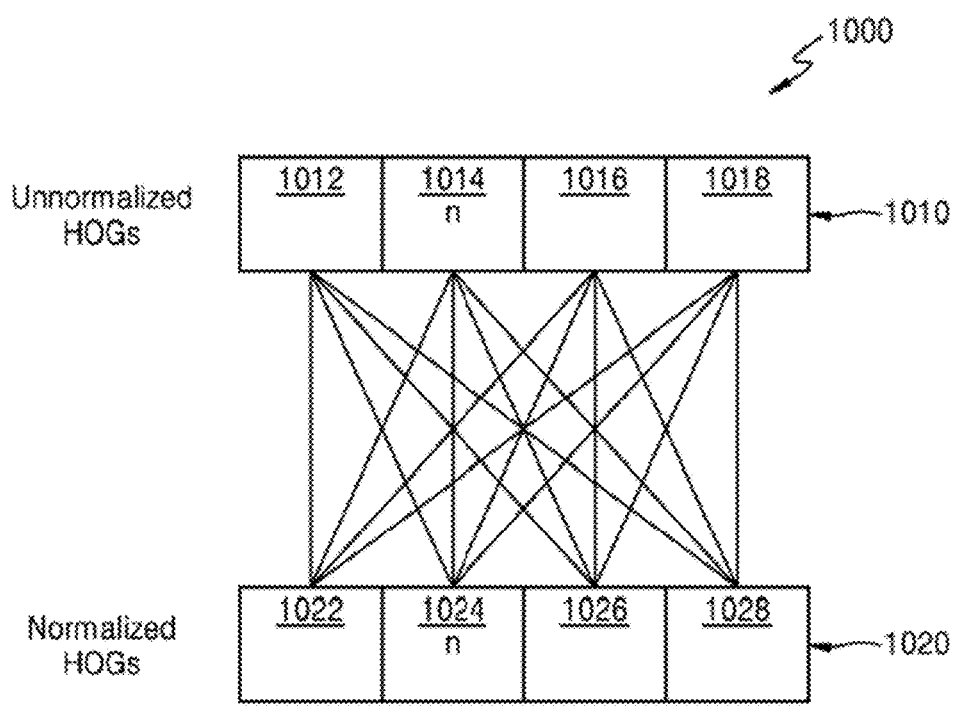
FIG. 10 is a schematic block diagram of an event-based HOG normalization layer in accordance with an exemplary embodiment of the present disclosure.

As shown in FIG. 10, an exemplary embodiment event-based HOG normalization mapping is indicated generally by the reference numeral 1000. Here, un-normalized HOGs 1010 include LIF neurons 1012, 1014, 1016 and 1018, where un-normalized LIF neuron 1014 is designated as the Nth neuron. Normalized HOGs 1020 include LIF neurons 1022, 1024, 1026 and 1028, where normalized LIF neuron 1024 is designated as the Nth neuron. Each of normalized neurons 1022, 1024, 1026 and 1028 may receive and accumulate inputs from one or more of un-normalized neurons 1012, 1014, 1016 and 1018, but the Nth normalized neuron 1024 will only fire upon input from the Nth un-normalized neuron 1014 in this exemplary normalization layer. For example, for all normalized neurons at a generic spatial location (i, j), each neuron may be connected to all un-normalized neurons in location (i, j), but the Nth normalized neuron is configured to fire only when its input n from the Nth un-normalized neuron fires.

Figure 11:
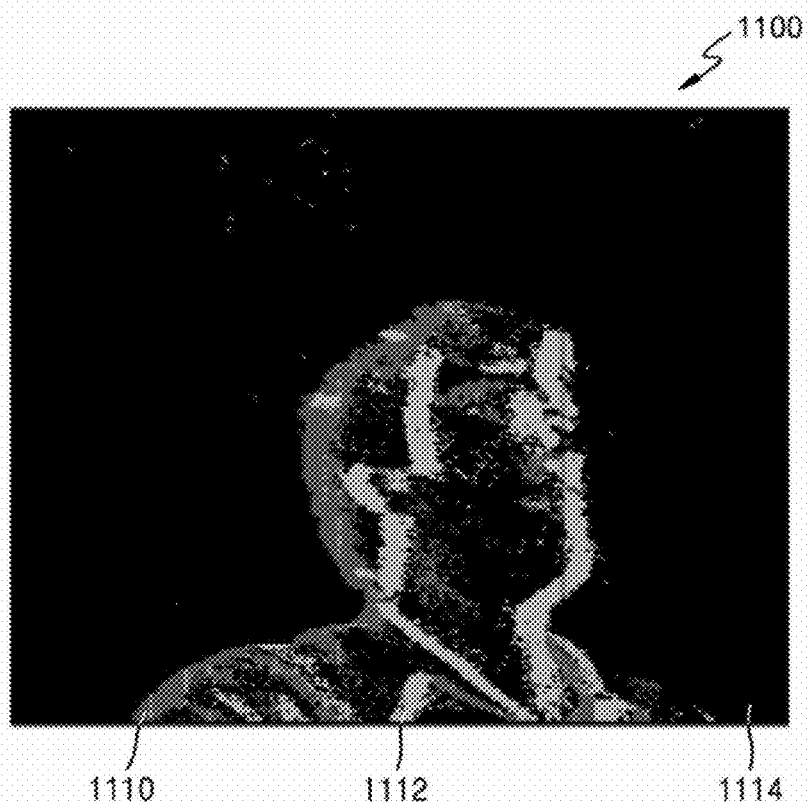
FIG. 11 is an image diagram of an output from an event-based camera over a short time interval in accordance with an exemplary embodiment of the present disclosure.

Turning to FIG. 11, an exemplary embodiment output from an event-based camera over a short time interval is indicated generally by the reference numeral 1100. Here, as a subject tilts backwards, the darker grey pixels 1110 indicate positive events, the lighter grey pixels 1112 indicate negative events, and the black pixels 1114 indicate no events.

Figure 12:
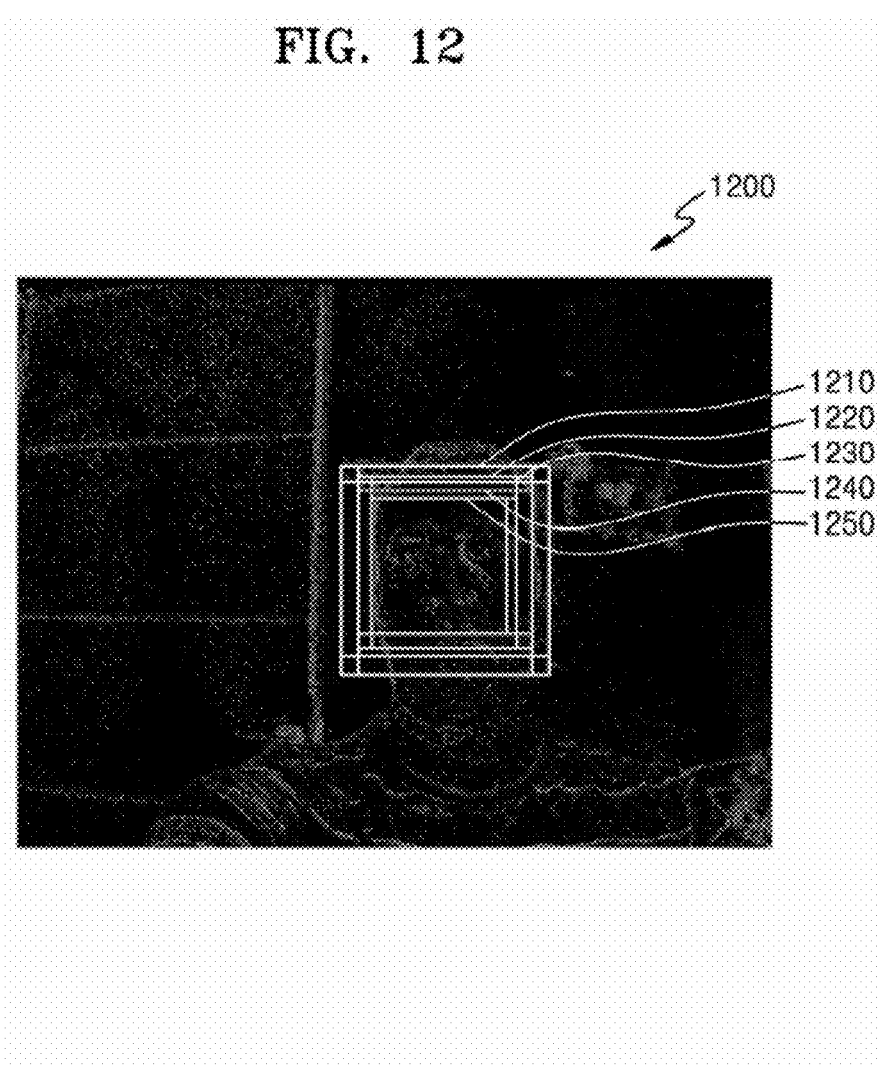
FIG. 12 is an image diagram of an event-based face detection application using HOGs as descriptors in accordance with an exemplary embodiment of the present disclosure.

Turning now to FIG. 12, an exemplary embodiment event-based face detection application using HOGs as descriptors is indicated generally by the reference numeral 1200. Here, a first HOG 1210, second HOG 1220, third HOG 1230, fourth HOG 1240 and fifth HOG 1250 may represent increasingly finer honing in upon distinguishing facial features. This is an example of a face detection application that uses the event-based HOG as a descriptor, which may be input directly to a face classifier.

Figure 13:
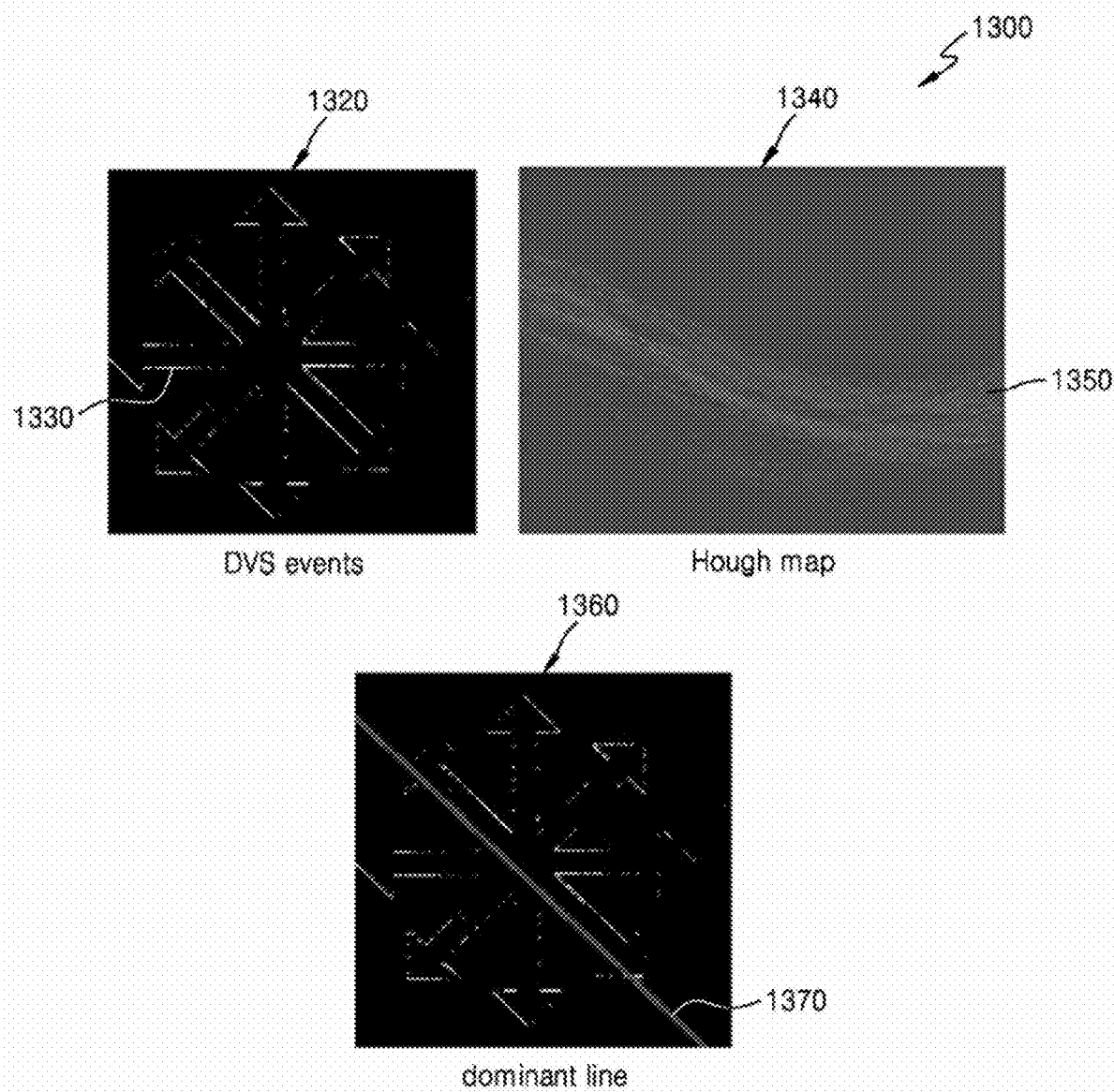
FIG. 13 is an image diagram of an event-based Hough transform for line detection in accordance with an exemplary embodiment of the present disclosure.

As shown in FIG. 13, an exemplary embodiment event-based Hough transform for line detection is indicated generally by the reference numeral 1300. Here, a DVS events map 1320 includes actual DVS events 1330. A Hough map 1340 includes salient Hough data 1350. Moreover, a feature map 1360 includes a dominant line 1370 detected in accordance with the Hough data. FIG. 8 show an example of an event based Hough transform that detects lines. The Hough map parameterization is distance from origin and angle of the line. Only the most dominant line, which corresponds to the highest peak in the map, is displayed.

In operation of an event-based histogram of gradients approach, event-based HOGs are calculated using LIF neurons as building blocks and laid out in a layered grid structure as in FIG. 9. The layers of computation may include an oriented gradients layer where the LIF neuron weights are configured to be orientation sensitive, such as seen in the left portion of FIG. 7 with weights configured for horizontal edge detection. Each grid of LIFs may be configured with the same weights where the number of grids in this layer corresponds to the number of orientations in the histogram.

The layers of computation may further include a weighted summation layer, such as seen in the right portion of FIG. 7 with weights configured for weighted summation. In this layer, local regions of oriented edge values are summed using LIFs. The size of the receptive field may be determined based on the scale of extracted information desired.

The layers of computation may further include a normalization layer. It is possible to add a histogram normalization layer. This can be done by adding a normalization layer in which each neuron corresponds to a neuron in the previous layer and may actually fire only when its corresponding neuron fires. The receptive field for each neuron in this layer may be all neurons in the same spatial location for accumulation purposes, while only firing is contingent upon an event from the sole corresponding pixel as described for FIGS. 2 and 10.

The layers of computation may further implement an event-based Hough transform algorithm. The event-based Hough transform algorithm may work directly on the input events where such events are generally triggered by edges in the scene. This is unlike frame-based images where a Hough transform must generally be preceded by an edge detector.

A non-randomized Hough transform algorithm may use a LIF neuron as its basic computational unit. The receptive field of the neurons is configured according to the desired shape, and the neurons are laid out similarly to the Hough vote map in a manner that corresponds to the parameterization of choice such as in FIG. 5. When an input event is triggered, all corresponding LIFs that include this event's location in their receptive fields, respectively, are updated.

For the randomized Hough transform, not all LIFs are updated, but just a randomly selected subset. Another option which is possible due to the random arrival of events is to wait for enough events to constrain the shape unambiguously, such as, for example, two events for a line, three for a circle, or the like, and update only the one corresponding LIF.

Embodiments of the present disclosure may be implemented with any dynamic vision sensor or event-based camera, including those having the following three properties: 1) Each pixel has an inner state indicating the amount of light incident on the pixel, such as the current through a photodiode, where this state may be used to output an event when sufficient change to the amount of incident light is detected. 2) There is a mechanism for setting this state to a predetermined value, such as setting the value to the equivalent state of no incident light incident, for a set of pixels. 3) The events triggered following the reset are output in close temporal proximity to the reset operation. In alternate embodiments, the inner state may be voltage across a phototransistor or the like.

Embodiments of the present disclosure may enable output of luminance change events as well as image features through a dynamic vision sensor without the need for additional circuits per pixel such as to provide intensities directly, or for redundant pixel arrays as in frame-based sensors to differentiate dynamic changes. The present approach permits the use of basic dynamic vision sensors to provide event-based image feature results. Compared to traditional frame-based image sensors, DVS may achieve lower latency similar to a faster frame rate in such traditional frame-based sensors.

In operation, a DVS or event-based camera outputs a signal triggered by changes in light intensity for each pixel. As disclosed herein, integrating the relevant event signal over time provides an indication of the light intensity currently incident upon the pixel relative to the intensity just prior to the integration.

The initial intensity or intensity offset is preferably known or selected. This may be achieved by explicitly resetting the intensity offset to a predetermined value, for example. The period of event accumulation following a reset is preferably kept short so as to minimize noise due to movements in the scene and/or sensor noise. Extracting a full intensity image from the sensor may entail performing this process in a gradual manner, each time measuring the intensities for a different set of the pixels, depending on the parameters of the application and bandwidth limitations of the sensor output.

Extracting an image feature, whether an area or region of interest, line, row, column, or face, may be performed by resetting all corresponding pixels at once if this conforms with the bandwidth limitations of a given dynamic vision sensor. If desired, bandwidth requirements may be further reduced by increasing the threshold to provide a lower bit-depth intensity image.

Embodiments of the present disclosure enable the extraction of image features from event cameras with minimal adjustments on the sensor side. Extracted image features may benefit from the high dynamic range of appropriate DVS sensors. Moreover, a design or implementation trade-off may be made between image bit depth versus larger receptive fields for simultaneous capture, as opposed to a gradual capture potentially more susceptible to motion in the scene, by selecting or controlling the receptive field, weightings, base and/or threshold.

A Hough transform and a histogram of gradients may be used in different layers of a single embodiment. For example, a Hough transform may be preceded by a directionally sensitive filter, which may be implemented by a HOG.

Although exemplary embodiments of the present disclosure have been shown and described, it shall be understood that those of ordinary skill in the pertinent art may make changes therein without departing from the principles, scope or spirit of the inventive concept as defined by the appended claims and their equivalents.

What is claimed is:

1. A method for event-based image feature extraction comprising:
reducing an accumulated magnitude of a leaky integrate and fire (LIF) neuron based on a difference between a current time and a previous time;
receiving at least one event input from at least one dynamic vision sensor (DVS) pixel at the current time;
weighting the at least one received input;
adding the at least one weighted input to the reduced magnitude to form an accumulated magnitude of the LIF neuron at the current time; and
if the accumulated magnitude reaches a threshold, firing the neuron and decreasing the accumulated magnitude, wherein the decrease upon firing is equal to the accumulated magnitude if the accumulated magnitude is less than a base, or equal to the base if the accumulated magnitude is greater than or equal to the base.

2. The method of claim 1 wherein each at least one received input is either +1 or −1 prior to weighting.

3. The method of claim 1 wherein the LIF neuron receives event inputs from a plurality of DVS pixels in a receptive field.

4. The method of claim 3 wherein the event inputs from the receptive field are individually weighted to implement a Hough transform.

5. The method of claim 3 wherein the receptive field includes an array of DVS pixels.

6. The method of claim 3 wherein the event inputs from the receptive field are individually weighted to implement a histogram of gradients (HOG).

7. The method of claim 1 wherein a first plurality of LIF neurons is arranged in a first layer.

8. The method of claim 7 wherein another plurality of LIF neurons is arranged in another layer.

9. The method of claim 8 wherein each of the other plurality of LIF neurons receives event inputs from at least one of the first plurality of LIF neurons.

10. The method of claim 8 wherein each of the other plurality of LIF neurons receives event inputs from all of the first plurality of LIF neurons.

11. The method of claim 8 wherein each of the other plurality of LIF neurons triggers an event output upon reaching an accumulated threshold based on an event input from any of the first plurality of LIF neurons in its receptive field.

12. The method of claim 8 wherein each of the other plurality of LIF neurons receives event inputs from all of the first plurality of LIF neurons in its receptive field, but triggers an event output only upon an event input from a corresponding one of the first plurality of LIF neurons.

13. The method of claim 1 wherein the reduction is based on an exponential decay function.

14. The method of claim 1 wherein the LIF neuron is one of a plurality of LIF neurons arranged in a plurality of levels, the method further comprising:
  implementing a directionally sensitive filter using a HOG in one of the plurality of levels; and
  implementing a Hough transform responsive to the directionally sensitive filter in another of the plurality of levels.

15. A non-transitory computer readable medium tangibly embodying a program of instruction steps executable by a processor for extracting event-based image features through a dynamic vision sensor, the instruction steps comprising:
  reducing an accumulated magnitude of a leaky integrate and fire (LIF) neuron based on a difference between a current time and a previous time;
  receiving at least one event input from at least one dynamic vision sensor (DVS) pixel at the current time;
  weighting the at least one received input;
  adding the at least one weighted input to the reduced magnitude to form an accumulated magnitude of the LIF neuron at the current time; and
  if the accumulated magnitude reaches a threshold, firing the neuron and decreasing the accumulated magnitude,
  wherein the decrease upon firing is equal to the accumulated magnitude if the accumulated magnitude is less than a base, or equal to the base if the accumulated magnitude is greater than or equal to the base.

16. A method for event-based image processing comprising:
  providing a plurality of leaky integrate and fire (LIF) neurons wherein each of the plurality of LIF neurons communicates with at least one other of the plurality of LIF neurons;
  reducing an accumulated magnitude of each of the plurality of LIF neurons based on a difference between a current time and a previous time;
  receiving by at least one of the plurality of LIF neurons at least one event input from at least one dynamic vision sensor (DVS) pixel at the current time;
  weighting the at least one received input;
  adding the at least one weighted input to the reduced magnitude to form an accumulated magnitude of the at least one of the plurality of LIF neurons at the current time; and
  if the accumulated magnitude of the at least one of the plurality of LIF neurons reaches a threshold, firing the at least one of the plurality of LIF neurons and decreasing its accumulated magnitude,
  wherein the decrease upon firing is equal to the accumulated magnitude if the accumulated magnitude is less than a base, or equal to the base if the accumulated magnitude is greater than or equal to the base.

17. The method of claim 16, further comprising:
  if the accumulated magnitude of the at least one of the plurality of LIF neurons reaches a threshold based on receiving signals from a plurality of event inputs, but is conditioned to fire only upon receiving a signal from a particular one of the plurality of event inputs, firing the at least one of the plurality of LIF neurons and decreasing its accumulated magnitude upon receiving the signal from the particularone of the plurality of event inputs.

18. The method of claim 16 wherein the plurality of leaky integrate and fire (LIF) neurons is provided in a multi-dimensional array having at least two conceptual dimensions (2D).

19. The method of claim 16 wherein:
  the plurality of LIF neurons is provided in a multi-dimensional array having three conceptual dimensions (3D), the 3D array comprising a plurality of layers of LIF neurons where each LIF neuron of a layer is interconnected to all of the LIF neurons of each directly adjacent layer, and
  a first of the plurality of layers implements an un-normalized histogram of gradients (HOG) and a second of the plurality of layers implements a normalized HOG.

20. The method of claim 16 wherein:
  the plurality of LIF neurons is provided in a multi-dimensional array having three conceptual dimensions (3D), the 3D array comprising a plurality of layers of LIF neurons where each LIF neuron of a layer is interconnected to all of the LIF neurons of each directly adjacent layer,
  a first of the plurality of layers implements a histogram of gradients (HOG) and a second of the plurality of layers implements a Hough transform,
  the first of the plurality of layers is interconnected with the DVS pixels, each LIF of the first of the plurality of layers having a receptive field responsive to a plurality of the DVS pixels, and
  the receptive fields are non-overlapping.

* * * * *